Aug. 10, 1965  B. SCHUBERT  3,199,418
FILTER MACHINE

Filed Sept. 4, 1964  3 Sheets-Sheet 1

Aug. 10, 1965   B. SCHUBERT   3,199,418
FILTER MACHINE
Filed Sept. 4, 1964   3 Sheets-Sheet 2

Aug. 10, 1965  B. SCHUBERT  3,199,418
FILTER MACHINE
Filed Sept. 4, 1964  3 Sheets-Sheet 3
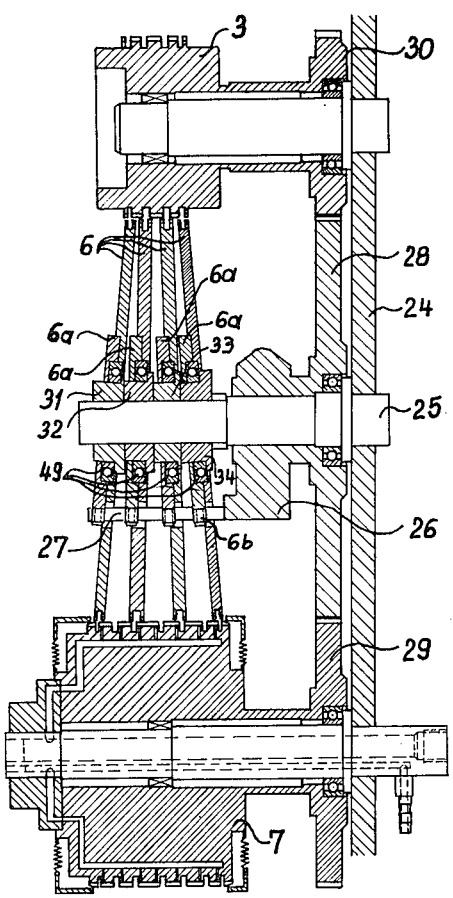
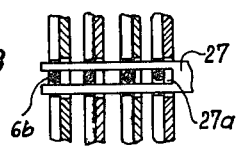
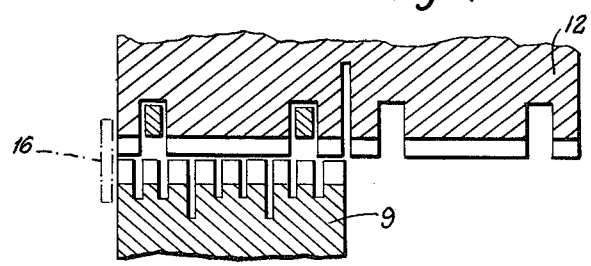

United States Patent Office 3,199,418
Patented Aug. 10, 1965

3,199,418
FILTER MACHINE
Bernhard Schubert, Hamburg-Lohbrugge, Germany, assignor to Hauni Werke, Körber & Co. K.G., Hamburg-Bergedorf, Germany
Filed Sept. 4, 1964, Ser. No. 396,465
Claims priority, application Germany, Nov. 25, 1958, H 34,898
17 Claims. (Cl. 93—1)

This is a continuation-in-part of my application Serial No. 854,770, filed on November 23, 1959 and now abandoned.

The present invention relates to filter machines in general, and more particularly to an apparatus which is used for making composite filter mouthpieces for cigarettes, cigars, cigarillos, cheroots and similar rod-shaped smokers' articles. Still more particularly, the invention relates to improvements in methods and apparatus for the production of filter mouthpieces of multiple unit length wherein rod-like members of a first filter material alternate with rod-like members of a second filter material.

In the production of composite mouthpieces, it is customary to shuffle rod-like members including sections of double unit length which consist of a first filter material with rod-like members including sections of double unit length which consist of a second filter material so that the sections of one material alternate with sections of the other material, and to thereupon wrap the resulting assembly into a wrapper of adhesive-coated tape to form a composite mouthpiece of multiple unit length which may be subdivided to yield several mouthpieces of unit length or double unit length ready to be fed into a filter cigarette machine. However, and particularly when the sections of double unit length are rather short, it is quite difficult to manipulate them with sufficient accuracy to insure that the sections will be shuffled and wrapped with utmost precision in order to reduce the number of discards and to avoid lengthy interruptions in the operation of the machine. Of course, the likelihood of misalignment, inadvertent ejection by centrifugal force and/or destruction of filter rod material is even more pronounced if the filter rods are subdivided into very short sections of double unit length and into filters of unit length. As a rule, the filters of unit length are very short and, therefore, they are difficult to manipulate particularly in a high-speed filter machine which must produce filter mouthpieces at the rate required in a modern filter cigarette machine.

Accordingly, it is an important object of the present invention to provide a novel apparatus for severing, shuffling, wrapping and otherwise manipulating comparatively short rod-like members of unit length and multiple unit length.

Another object of the invention is to provide a novel spreader which may be used in an apparatus of the just outlined characteristics and which is capable of automatically changing the spacing between a row of coaxial rod-like members so as to provide gaps for insertion of additional rod-like members when two types of filter rod material are shuffled to form composite mouthpieces of multiple unit length.

A further object of the invention is to provide a novel shifting or aligning device which may be used in such apparatus and which is capable of transforming pairs of coaxial rod-like members into a single file of transversely aligned rod-like members.

An additional object of the invention is to provide a novel method of manipulating rod-like members in the production of composite filter mouthpieces and the like according to which the rod-like members are processed in such a way that they undergo a minimum of deformation and may be severed, shuffled, wrapped and otherwise treated in a small area, at high speeds, and with utmost precision.

Still another object of the invention is to provide a novel method of transforming filter rods and similar elongated rod-shaped members into rows of coaxial but spaced shorter rod-shaped sections in such a way that the gaps between the sections will be of predetermined length.

A further object of the invention is to provide a method of transforming rows of coaxial rod-shaped members into a single file of transversely aligned parallel rod-shaped members.

Briefly stated, one feature of my invention resides in the provision of a method of producing composite mouthpieces of multiple unit length. The method comprises advancing a series of parallel rods consisting of a first filter material sideways in an elongated path, subdividing the rods in a cutting zone located in a first portion of the path to form pairs of coaxial rod-like members, removing the first rod-like member of each pair from a second portion of the path located past the first portion so that the second rod-like member of each pair remains in and advances toward the first portion of the path, shifting the second rod-like member of each pair axially and into the space previously occupied by the first rod-like member of the respective pair while the second members advance in a third portion of the path located ahead of the first portion so that the thus shifted second rod-like members bypass the cutting zone, removing the second rod-like members from the second portion of the path so that, upon removal from the path, the first and second rod-like members form a single file of transversely aligned rod-like members, subdividing each rod-like member at a cutting station into a row of coaxial sections of a length as required in a composite mouthpiece of multiple unit length, spreading the thus obtained sections by moving the sections of each consecutive row sideways in a series of arcuate paths of identical length but diverging in a direction away from the cutting station whereby the sections of each row are moved out of exact axial alignment with each other, removing the sections of consecutive rows from the respective arcuate paths at a predetermined distance from the cutting station so that the sections are then located at a predetermined distance from each other, returning the thus removed sections in accurate axial alignment with each other, shuffling the sections of each consecutive row with rod-like sections of a second filter material to form assemblies wherein sections of first material alternate with sections of second material, and wrapping the assemblies into wrappers of adhesive-coated tape to form composite mouthpieces of multiple unit length.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 12 is a section as seen in the direction of arrows from the line A–B of FIG. 11;

FIG. 13 is a fragmentary section substantially as seen in the direction of arrows from the line D—D of FIG. 12; and FIG. 14 is a fragmentary axial section through a pair of cooperating conveyors in the apparatus of FIG. 11.

Figure 1:
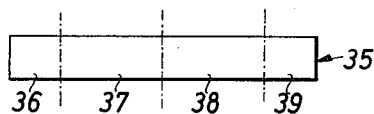
FIG. 1 is a side elevational view of a first filter rod of multiple unit length which may be processed in the apparatus of my invention.

Referring to the drawings, and first to FIG. 1, there is illustrated a first filter rod 35 (hereinafter called white filter rod) of sextuple unit length. This rod is subdivided in planes indicated by vertical broken lines to yield two rod-like end filters or outer filters 36, 39 of unit length and two rod-like intermediate sections 37, 38 of double unit length. In the next step, shown in FIG. 2, the filters 36, 39 and sections 37, 38 are spread or shifted substantially axially and away from each other to provide three gaps of at least double unit length. Once the shifting step is completed, all of these filters and sections are returned in exact axial alignment with each other.

Figure 2:
FIG. 2 illustrates a row of rod-like end filters of unit length and rod-like sections of double unit length which are obtained by subdivision of the filter rod.
Figure 3:
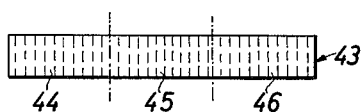
FIG. 3 illustrates a different filter rod.
Figure 4:
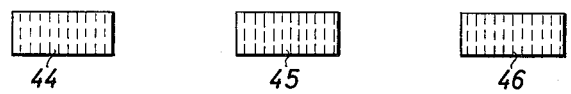
FIG. 4 shows three sections of double unit length which are obtained by subdivision of the filter rod shown in FIG. 3.

FIG. 3 shows a second filter rod 43 (hereinafter called black filter rod) of sextuple unit length whose material is different from the material of the white rod 35. This black filter rod is severed in planes indicated by vertical broken lines to yield three black rod-like sections 44, 45, 46 of double unit length. As shown in FIG. 4, the sections 44 and 46 are then moved substantially axially and away from the median section 45 to provide two gaps of at least double unit length, i.e., the length of the gaps shown in FIG. 4 at least equals the length of a white section 37 or 38. Also, the length of the gaps shown in FIG. 2 at least equals the length of a black section 44, 45 or 46. However, the length of a black section need not be the same as that of a white section.

Figure 5:
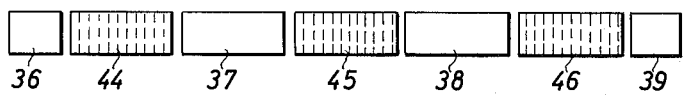
FIG. 5 illustrates an assembly which is obtained by shuffling the filters and sections of FIG. 2 with the sections of FIG. 4.
Figure 6:
FIG. 6 illustrates the assembly of FIG. 5 in condensed or shortened condition in which the assembly is ready for wrapping.
Figure 7:
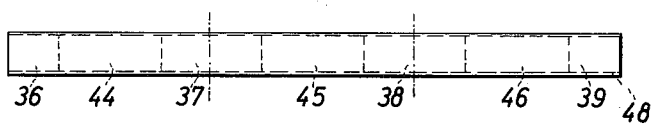
FIG. 7 illustrates the assembly in wrapped condition and forming a mouthpiece of sextuple unit length.

In the next step, the row of coaxial filters 36, 39 and sections 37, 38 is shuffled or interdigitated with the row shown in FIG. 4 in such a way that the two rows form a first assembly (see FIG. 5) wherein white filters and white sections alternate with black sections and wherein the adjoining filters and sections are separated by narrow clearances whose presence is due to the fact that the length of gaps between the rod-shaped members of the row shown in FIG. 2 exceeds somewhat the length of a black section and that the length of gaps between the rod-shaped members of the row shown in FIG. 4 exceeds somewhat the length of a white section. In order to eliminate such clearances, the assembly of FIG. 5 is condensed or shortened axially by moving the filters 36, 39 toward each other whereby the coaxial members 36–39 and 44–46 form a second assembly 47, shown in FIG. 6, wherein each white section is in actual abutment with two black sections and wherein each black section is in actual abutment with two white sections or with a white section and an end filter. This second assembly 47 is then wrapped into an adhesive-coated wrapper 48, see FIG. 7, so that it forms a composite mouthpiece of sextuple unit length. The mouthpiece is severed in planes indicated by vertical broken lines to yield three duplex mouthpieces of double unit length. The leftmost mouthpiece of double unit length comprises the end filter 36, the black section 44, and half of the white section 37. Such duplex mouthpieces are then arranged in a single file to be fed between pairs of coaxial tobacco rods in order to form a filter cigarette of double unit length in a manner well known in the art and not forming part of the present invention.

Figure 11:
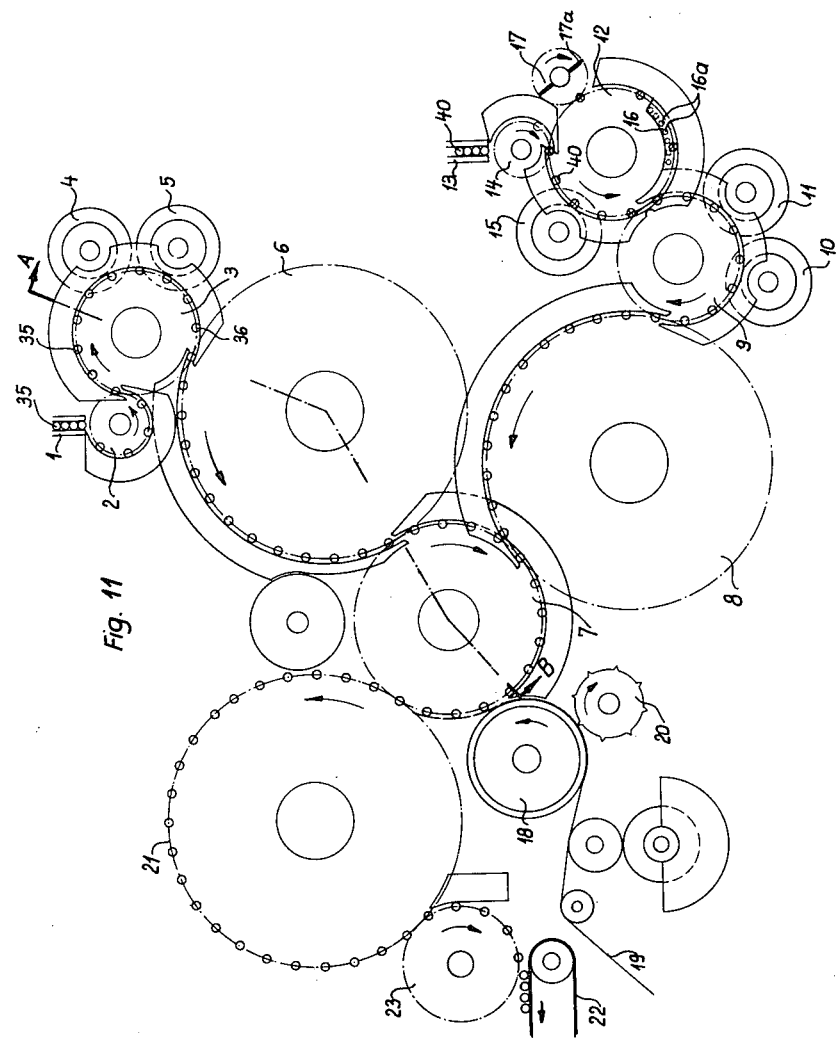
FIG. 11 is a diagrammatic side elevational view of an apparatus which may be utilized for the production of composite mouthpieces of the type shown in FIG. 7.

The apparatus which is utilized for carrying out the just described method is illustrated in FIGS. 11 and 12. This apparatus comprises a first source (for example, a magazine) having a vertical or inclined chute 1 which discharges white filter rods 35 seriatim and sideways (i.e., in a direction at right angles to their axes) by gravity feed so that the rods enter consecutive pockets or holders provided on the periphery of a revolving inserting or feed conveyor 2 here shown as a drum which rotates about a horizontal axis. The pockets are parallel to the axis of the drum 2, and this drum is surrounded by arcuate retaining shields of requisite length which insure that the rods 35 remain in the respective pockets while travelling in an arcuate path extending from the discharge end of the chute 1 to a transfer station between the drum 2 and a transfer conveyor 3 again shown in the form of a rotary drum which, for convenience, will be called cutting drum because it cooperates with three rotary disk-shaped cutters including a first cutter 4 which severs each white rod 35 midway between its ends (see the central vertical broken line in FIG. 1) and two coaxial cutters 5 which sever the thus halved white rods so that the halves respectively yield a filter 36 and a section 37 or a filter 39 and a section 38. The pockets of the drum 3 are parallel to its axis, and this drum is also surrounded by arcuate retaining shields which keep the rods 35, their halves and the filters 36, 39 and sections 37, 38 in the respective pockets while such rod-shaped members advance toward a transfer station between the drum 3 and a third conveyor, hereinafter called spreader, which is shown in FIG. 12.

The spreader of FIG. 12 comprises four circular disks 6 which are disposed in mutually inclined planes making acute angles with each other and each of which is provided with a series of equidistant axially extending peripheral pockets or holders. The disks 6 receive rows of filters 36, 39 and sections 37, 38 from the cutting drum 3 and deliver them to consecutive pockets or holders on the periphery of an assembly conveyor or drum 7. The pockets of the assembly drum 7 are parallel to its axis and might be slightly inclined with reference to the pockets of the disks 6, such minimal misalignment being due to inclination of the planes of the disks 6 with reference to the axis of their shaft 25. The inclination of the planes of disks 6 is such that the filters 36, 39 and sections 37, 38 are automatically spaced from each other when they travel in diverging arcuate paths from the transfer station between the spreader and the drum 3 toward the transfer station between the spreader and the assembly drum 7. It will be noted that portions of the disks 6 are surrounded by arcuate retaining shields which keep the white filters and white sections in the respective pockets while such filters and sections advance toward the assembly drum 7. The drums 3 and 7 are angularly displaced a distance of substantially 180°, as seen along the circumference of the disks 6.

The apparatus of FIG. 11 comprises a second source (e.g., a magazine) which contains a supply of black filter rods 43, and such rods are fed into consecutive pockets or holders of a second cutting or transfer drum 9 which rotates about a horizontal axis and cooperates with two circumferentially and axially staggered rotary disk-shaped cutters 11, 10 which sever each consecutive black rod to form rows of coaxial black sections 44, 45, 46. The drum 9 also cooperates with suitable retaining shields in the same way as the drum 3. The rows of black sections 44–46 are then transferred into consecutive pockets of disks 8 forming a second spreader which is analogous to the spreader of FIG. 12 with the important exception that it comprises only three disks, i.e., one disk for each black section in any given row. The disks 8 transfer the rows of sections 44–46 in divergent arcuate paths and into consecutive pockets of the assembly drum 7. At the same time, the disks 8 move the sections 44, 46 of each row substantially axially and away from the median section 45 so as to form the gaps of double unit length which are shown in FIG. 4. Also, the disks 8 and 6 are staggered with reference to each other in such a way that the disks 8 deposit black sections into the gaps between the white filters and white sections, i.e., once a pocket of the transfer drum 7 has advanced past the transfer station where it receives black sections from the disks 8, it contains an assembly of the type shown in FIG. 5 wherein the filters 36, 39 are disposed at the ends and the white sections alternate with black sections. Such assemblies are then condensed axially by the inclined faces of stationary cams which surround a portion of the assembly drum 7 and act against the outer end faces of the white filters 36, 39. In other words, even before the rod-shaped members are about to leave the pockets of the assemby drum 7, they form assemblies 47 of the type shown in FIG. 6 wherein the end faces of adjoining sections and filters are in actual abutment with each other. The assembly drum 7 cooperates with a rotary suction drum 18 of known design which in turn cooperates with a bladed cutter drum 20 serving to cut a length of adhesive coated tape 19 into a series of shorter wrappers 48. The tape 19 is payed out by a suitable reel (not shown) and travels past a conventional paster which coats its underside with a layer of adhesive. The peripheral speed of the suction drum 18 exceeds the speed of the tape 19 so that the leading end portion of the tape slips along the periphery of the suction drum whereby the wrappers 48 which are formed by the blades of the cutter drum 20 move apart in a fully automatic way and their adhesive-coated sides adhere to consecutive assemblies 47 of filters and white and black sections travelling with the pockets of the assembly drum 7. The drum 7 delivers such assemblies (with wrappers 48 adhering thereto) into consecutive pockets of a conventional wrapping drum 21 which is provided with means for convoluting the wrappers 48 around the respective assemblies 47 to form composite mouthpieces of sextuple unit length. The wrapping drum 21 cooperates with a heating drum (shown above the assembly drum 7) which insures that the adhesive is dried shortly after a wrapper is fully convoluted around the respective assembly.

The wrapping drum 21 delivers mouthpieces of sextuple unit length into consecutive pockets of a further transfer drum 23 which deposits the mouthpieces onto the upper stringer of a belt conveyor 22. The conveyor 22 advances the mouthpieces to storage or to a filter cigarette machine. Of course, the drum 23 may cooperate with two disk-shaped cutters (not shown) to sever each consecutive mouthpiece in two spaced lanes (see the vertical broken lines in FIG. 7) so that each mouthpiece of sextuple unit length yields three duplex mouthpieces of double unit length. Such duplex mouthpieces are ready to be fed into a filter cigarette machine.

The drums 7 and 9 are angularly spaced a distance of nearly 180 degrees, as seen in the circumferential direction of the disks 8. Also, and though FIG. 11 does not show retaining shields or other retaining means which hold the assemblies in the respective pockets of the drum 21, it is clear that each conveyor of my apparatus is provided with suitable mechanical and/or pneumatic retaining means which keep the rod-shaped members in the respective pockets. A wrapping drum which may be used in the apparatus of the present invention is disclosed in my U.S. Letters Patent No. 2,714,384.

Figure 8:
FIG. 8 illustrates a different filter rod which may be used as a substitute for the filter rod of FIG. 3.
Figure 9:
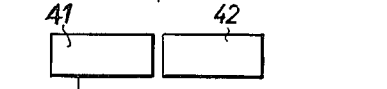
FIG. 9 illustrates two sections of sextuple unit length which are obtained by halving the filter rod of FIG. 8.

The apparatus of FIGS. 11 and 12 may be utilized in connection with white and black filter rods of different length. Thus, and as shown in FIG. 8, one may start with a black filter rod 40 of twelve times unit length which is severed midway between its ends (see the vertical broken line in FIG. 8) to yield two black sections 41, 42 of sextuple unit length, shown in FIG. 9. The apparatus then comprises a magazine or a similar source of black filter rods 40 having a chute 13 which discharges the rods seriatim into the pockets of a second inserting or feed drum 14. This drum delivers the rods into alternate pockets of a shifting or aligning drum 12 cooperating with a rotary disk-shaped cutter 15 so that the rods 40 are severed and yield pairs of coaxial black sections 41, 42. The drum 12 is axially offset with reference to the drum 9 (see FIG. 14) so that one-half thereof extends beyond the right-hand end face of the drum 9. Consequently, the sections 41 may be transferred into each second pocket of the drum 9 but the sections 42 continue to rotate in an endless path with the drum 12 and are thereupon shifted axially by blasts of compressed air issuing from the orifices of a stationary nozzle 16a which is adjacent to one axial end of the drum 12. The other axial end of the drum 12 is adjacent to a fixed stop 16 which is located opposite the nozzle 16a and arrests the sections 42 in their new axial positons. In other words, the rods 40 issuing from the discharge end of the chute 13 are severed by the cutter 15 to yield pairs of coaxial sections 41, 42, the sections 41 are immediately transferred into alternate pockets of the drum 9, the sections 42 are shifted axially to occupy spaces (see the positions marked x in FIG. 11) previously occupied by the corresponding sections 41, and the thus shifted sections 42 are then transferred into the remaining pockets of the drum 9. The drum 12 is provided with an odd number of pockets (for example, with thirteen pockets), and the drum 9 is provided with an even number of pockets (for example, with twelve pockets). Therefore, and since the distance between the pockets of the drum 14 is twice the distance between the pockets of the drum 12, the drum 14 will deliver black rods 40 into the first, third, fifth, seventh, ninth, eleventh and thirteenth pocket of the drum 12 when the latter performs a first revolution, and into the second, fourth, sixth, eighth, tenth and twelfth pocket of the drum 12 when the latter performs the next revolution. In other words, each pocket of the drum 12 contains a rod 40, a pair of coaxial sections 41, 42, or a single section 42 which means that each consecutive pocket of the drum 9 receives a section 41 or 42 whereby the sections on the drum 9 form a single file of transversely aligned parallel sections. Such sections 41, 42 then advance past the rotary cutters 11, 10 whose axial positions are adjusted in such a way that each section 41 or 42 yields three sections of double unit length corresponding to but shorter than the sections 44–46 shown in FIGS. 3 and 4. Once the sections 42 are shifted by blasts of air issuing from the nozzle 16a and abut against the stop 16, they are free to bypass the cutter 15 so that this cutter merely severs the rods 40 but not the sections 42.

Figure 10:
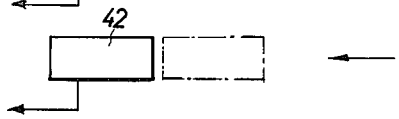
FIG. 10 illustrates the manner in which one of the sections shown in FIG. 9 is manipulated to move into a position of transverse alignment with the other section.

The drum 12 further cooperates with a kick-out or clean-out roller 17 having blades, studs, bristles or pins 17a whose tips extend into consecutive or alternate pockets of the drum 12 immediately upstream of the drum 14 to expel any such rods 40 and/or sections 41 which might have remained therein and which could interfere with the freshly admitted rods 40 delivered by the chute 13. The axially shifted sections 42 (in the full-line positions of FIG. 10) are not affected by the clean-out roller 17. In moving from its original position to the new position x, each secton 42 is shifted from the phantom-line to the full-line position of FIG. 10.

It is to be noted, however, that the rods 40 need not be shorter than the rods 35 or 43. Thus, and while the rod 40 of FIG. 8 is shown as being shorter than the rod 43 of FIG. 3, it is equally possible to use the apparatus of FIG. 11 is connection with rods 40 whose length is twice the length of a rod 43. Thus, the length of each section 41 or 42 then corresponds to the length of a rod 43. Also, a second drum 12 may be inserted between the drums 2 and 3 if the rods 35 are replaced by rods of twelve times unit length.

The exact constructon of the spreader including the disks 6 is shown in FIGS. 12 and 13. The apparatus comprises a vertical frame member 24 which fixedly supports the horizontal shaft 25 for a rotary driven member 26 having a motion transmitting portion in the form of a horizontal bifurcated arm 27. The arm 27 is substantially parallel to the shaft 25 and is located at a predetermined distance therefrom. The driven member 26 is fixed to or integral with the hub of a gear 28 which is rotatable on the shaft 25 and meshes with a pinion 29 which drives the assembly drum 7. The gear 28 also meshes with a pinion 30 which drives the cutting drum 3. The gear 28 is driven by the prime mover (not shown) of the apparatus and rotates the pinions 29, 30 at speeds which are necessary to insure accurate transfer of filters 36, 39 and sections 37, 38 from the drum 3 onto the disks 6, and to insure satisfactory transfer of such filters and sections from the disks 6 into the pockets of the assembly drum 7.

The shaft 25 supports four fixed bearing rings 31, 32, 33, 34 each serving to support one of the disks 6. The inclination of the peripheral surfaces on the rings 31–34 is such that the disks 6 are kept in mutually inclined planes to insure that the filters 36, 39 and sections 37, 38 are shifted substantially axially to form the gaps shown in FIG. 2. In other words, the disks 6 converge toward the periphery of the drum 3 but diverge in a direction toward the periphery of the assembly drum 7. Each disk 6 is provided with a detachable annular hub 6a which carries the outer race of an antifriction bearing 49 whose inner race is mounted on the corresponding bearing ring. The hubs 6a carry radially outwardly extending projections for follower rollers 6b which extend into a slot 27a of the arm 27, see FIG. 13. Thus, when the arm 27 is driven by the gear 28, the disks 6 are compelled to rotate with the gear 28 but the rollers 6b are free to reciprocate with reference to the arm 27.

It will be noted that the apparatus of FIG. 11 is readily convertible to produce composite mouthpieces of different unit length or different multiple unit length. Thus, and if filter rods 43 of sextuple unit length are fed directly into consecutive pockets of the drum 9, the parts 12–17 may be dispensed with. If the apparatus utilizes rods 40 of twelve times unit length, such rods are discharged from the chute 13 to be subdivided into sections 41, 42 of sextuple unit length whereby the length of sections 41, 42 may equal, be less than, or may exceed the length of a filter rod 43. The cutters 10, 11 are adjustable in the axial direction of the drum 9 so that they may sever each rod 43 or each section 41 or 42 into shorter sections of requisite axial length.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for producing composite mouthpieces of multiple unit length, in combination, a plurality of magazine chutes for discharging filter rods of different materials; a rotary feed drum adjacent to each chute; rotary transfer drums for receiving filter rods from said feed drums; cutting devices associated with said transfer drums for subdividing the respective filter rods into rod-like members of a length required in a mouthpiece of multiple unit length; an assembly drum for receiving such rod-like members; and spreaders including sets of disks arranged in side-by-side relation and interposed between the respective transfer drums and said assembly drum for transferring the rod-like members to said assembly drum in such a way that rod-like members of different materials alternate with each other, said spreaders further including shafts to support the respective sets of disks for rotation in planes which make acute angles with each other and diverge in directions from the respective transfer drums to said assembly drum, said disks having peripheral holders to receive rod-like members from the corresponding transfer drums and to deposit such members on said assembly drum in such a way that rod-like members deposited by one set of disks are spaced apart a distance sufficient to permit another set of disks to deposit rod-like members of different material therebetween, said transfer drums and said assembly drum being angularly displaced a distance of approximately 180 degrees as seen in the circumferential direction of the respective set of disks.

2. In an apparatus for producing composite mouthpieces of multiple unit length, in combination, a pair of magazines each arranged to discharge filter rods of multiple unit length consisting of different materials; a feed drum adjacent to each magazine and arranged to receive the respective filter rods; transfer drums for receiving filter rods from the respective feed drums; cutting devices associated with said transfer drums for subdividing the respective filter rods into rod-like members of a length as required in the mouthpiece of multiple unit length; an assembly drum; a pair of spreaders each including a set of disks arranged in side-by-side relation and interposed between the respective transfer drums and said assembly drum to deliver the rod-like members from said transfer drums to said assembly drum, each spreader further including a shaft arranged to support the respective set of disks for rotation in planes which make acute angles with each other and diverge in directions from the respective transfer drum to said assembly drum, said disks having peripheral holders to receive rod-like members from the respective transfer drums and to deposit such members on said assembly drum in such a way that rod-like members deposited by one set of disks are spaced apart a distance sufficient to permit the other set of disks to deposit rod-like members therebetween whereby the rod-like members on said assembly drum form assemblies containing rod-like members of one material alternating with rod-like members of the other material.

3. In an apparatus for producing composite mouthpieces of multiple unit length, in combination, a transfer conveyor arranged to convey rows of coaxial rod-like members of a length as required in a mouthpiece of multiple unit length; an assembly conveyor spaced from said transfer conveyor; and a spreader disposed intermediate said conveyors for transferring rows of rod-like members from said transfer conveyor to said assembly conveyor, said spreader comprising a plurality of disks disposed in mutually inclined planes making acute angles with each other and diverging in a direction from said transfer conveyor to said assembly conveyor, a shaft arranged to support said disks for rotation in the respective planes, drive means for rotating said disks, and peripheral holders provided on said disks and arranged to receive rod-like members from said transfer conveyor and to deliver such members to said assembly conveyor whereby the rod-like members of a row which is transferred to said assembly conveyor are automatically moved away from each other to define between themselves gaps of predetermined length.

4. A structure as set forth in claim 3, wherein each of said disks comprises a substantially radially extending projection and wherein said drive means comprises a driven member rotatable about the axis of said shaft and having an arm engaging said projections to thereby rotate said disks.

5. A structure as set forth in claim 4, wherein said projections comprise roller followers and wherein said arm is provided with an elongated slot which is substantially parallel with the axis of said shaft and receives said followers so that each follower moves back and forth in response to rotation of said arm.

6. In an apparatus for producing composite mouthpieces of multiple unit length, in combination, a magazine arranged to discharge a series of rod-like members sideways; a first conveyor comprising a plurality of parallel holders arranged to advance sideways in an endless path; means for transferring the rod-like members seriatim from said magazine into some of said holders while such holders advance in a first portion of said path; a cutting device adjacent to a second portion of said path located past said first portion for subdividing the rod-like members into pairs of coaxial rods; a second conveyor located past said cutting device for receiving from said holders the first rod of each pair so that the second rod remains in said path and advances toward said cutting device; shifting means adjacent to a third portion of said path located past said second conveyor but ahead of said cutting device for shifting the second rod of each pair axially and into the space previously occupied by the first rod of the respective pair so that the thus shifted second rods bypass said cutting device to be delivered to said second conveyor whereon the first and second rods form a single file of transversely aligned rods; cutting means associated with said second conveyor for subdividing each of the transversely aligned rods into a plurality of coaxial sections of a length as required in a mouthpiece of multiple unit length; an assembly conveyor; and a spreader including a set of disks arranged in side-by-side relation and interposed between said second conveyor and said assembly conveyor to deliver the sections obtained by subdividing consecutive rods to said assembly conveyor, said spreader further including a shaft arranged to support said disks for rotation in planes which make acute angles with each other and diverge in directions from said second conveyor to said assembly conveyor, said disks having peripheral holders to receive sections from said second conveyor and to deposit such sections on the assembly conveyor whereby the sections obtained from consecutively subdivided rods are automatically spaced apart while advancing from said second conveyor to said assembly conveyor.

7. In an apparatus for manipulating rod-shaped members, in combination, a first conveyor comprising a plurality of parallel holders arranged to advance sideways in an endless path; means for feeding rod-shaped members into some of said holders while such holders advance in a first portion of said path; a cutting device adjacent to a second portion of said path located past said first portion to subdivide the rod-shaped members into pairs of coaxial rods; a second conveyor located past said cutting device for receiving from said holders the first rod of each pair so that the second rod remains in said path and advances toward said cutting device; and shifting means adjacent to a third portion of said path located past said second conveyor but ahead of said cutting device for shifting the second rod of each pair axially and into the space previously occupied by the first rod of the respective pair so that the thus shifted second rods bypass said cutting device to be delivered to said second conveyor whereon the first and second rods form a single file of transversely aligned rods.

8. In an apparatus for manipulating rod-shaped members, particularly for shuffling portions of filter rod material to form composite mouthpieces of multiple unit length, in combination, a first conveyor comprising an odd number of parallel equidistant holders arranged to advance in an endless path and being substantially normal to said path; means for feeding rod-shaped members into alternate holders of said conveyor while such holders advance in a first portion of said path; a cutting device adjacent to a second portion of said path located past said first portion to subdivide the rod-shaped members into pairs of coaxial rods; a second conveyor located past said cutting device and having an even number of holders parallel with and having the same mutual spacing as the holders of said first conveyor so that each second holder of said second conveyor may receive the first rod of each pair whereby the second rod remains in said path and advances toward said cutting device; and shifting means adjacent to a third portion of said path which is located past said second conveyor but ahead of said cutting device to shift the second rod of each pair axially and into the space previously occupied by the first rod of the respective pair whereby the thus shifted second rods bypass the cutting device and enter the remaining holders of said second conveyor whereon the first and second rods form a single file of transversely aligned rods.

9. In an apparatus for manipulating rod-like members, in combination, a first conveyor comprising a plurality of parallel holders arranged to advance sideways in an endless path and to accommodate pairs of coaxial rod-like members; a second conveyor having a plurality of holders parallel to the holders of said first conveyor and arranged to receive the first member of each pair so that the second member remains in said path; and shifting means located past said second conveyor for shifting the second member of each pair axially and into the space previously occupied by the first member of the respective pair so that the thus shifted second members may be delivered to the holders of said second conveyor whereon the first and second members form a single file of transversely aligned members.

10. A structure as set forth in claim 9, further comprising means for ejecting from the holders of said first conveyor any such rod-like members which, while advancing past said shifting means, fail to move axially and into the spaces previously occupied by the first members of the respective pairs.

11. A structure as set forth in claim 9, wherein said shifting means comprises a fixed stop located at one end of each holder advancing in a portion of said path which is located past said second conveyor, and nozzle means located opposite said stop means and at the other ends of holders passing along said stop means, said nozzle means being arranged to discharge blasts of compressed gas to shift the second members axially and into abutment with said stop means.

12. A structure as set forth in claim 9, wherein said conveyors are rotary drums and wherein said holders are axially parallel pockets provided in the peripheries of said drums.

13. In a method of producing composite mouthpieces of multiple unit length, the steps of advancing a series of consecutive filter rods of multiple unit length sideways in an elongated path; subdividing each filter rod into a row of coaxial sections; spreading the thus obtained sections by moving the sections of consecutive rows sideways in a series of arcuate paths of identical length but diverging in directions away from said elongated path whereby the sections of each row are moved out of accurate axial alignment with each other; removing the sections of consecutive rows from said arcuate paths at a predetermined distance from said elongated path so that the sections are then located at a predetermined distance from each other; and returning the thus removed sections of consecutive rows in exact axial alignment with each other.

14. In a method of manipulating rod-like members, the steps of advancing a series of parallel rod-like members sideways in an endless path; subdividing the rod-like members in a cutting zone located in a first portion of said path to form pairs of coaxial sections; removing the first section of each pair from a second portion of said path located past said first portion so that the second section of each pair remains in and advances toward the first portion of said path; shifting the second sections of consecutive pairs axially and into the spaces previously occupied by the first sections of the respective pairs while the second sections advance in a third portion of said path located ahead of said first portion so that the thus shifted second sections bypass the cutting zone; and removing the second sections from the second portion of said path so that, upon removal from said path, the first and second sections form a single file of transversely aligned sections.

15. A method of producing composite mouthpieces of multiple unit length, comprising the steps of advancing a series of rods of multiple unit length and consisting of a first filter material sideways in an elongated path; subdividing each rod into a row of coaxial sections; spreading the thus obtained sections by moving the sections of consecutive rows sideways in a series of arcuate paths of identical length but diverging in directions away from said elongated path whereby the sections of each row are moved out of accurate axial alignment with each other; removing the sections of consecutive rows from their arcuate paths at a predetermined distance from said elongated path so that the sections are then located at a predetermined distance from each other; returning the thus removed sections of consecutive rows in exact axial alignment with each other; shuffling the sections of each consecutive row with sections of a second filter material to form assemblies wherein sections of first material alternate with sections of second material; and wrapping the assemblies into wrappers of adhesive-coated tape to form composite mouthpieces of multiple unit length.

16. A method of producing composite mouthpieces of multiple unit length, comprising the steps of advancing a series of parallel rods consisting of a first filter material sideways in an endless path; subdividing the rods in a cutting zone located in a first portion of said path to form pairs of coaxial rod-like members; removing the first rod-like member of each pair from a second portion of said path located past said first portion so that the second rod-like member of each pair remains in and advances toward the first portion of said path; shifting the second rod-like member of each pair axially and into the space previously occupied by the first rod-like member of the respective pair while the second rod-like members advance in a third portion of said path located ahead of said first portion so that the thus shifted second rod-like members bypass the cutting zone; removing the second rod-like members from the second portion of said path so that, upon removal from said path, the first and second rod-like members form a single file of transversely aligned members; subdividing each rod-like member at a cutting station into a row of coaxial sections of a length as required in a mouthpiece of multiple unit length; spreading the thus obtained sections by moving the sections of each consecutive row sideways in a series of arcuate paths of identical length but diverging in a direction away from said cutting station whereby the sections of each row are moved out of accurate axial alignment with each other; removing the sections of consecutive rows from said arcuate paths at a predetermined distance from said cutting station so that the sections are then located at a predetermined distance from each other; returning the thus removed sections in exact axial alignment with each other; shuffling the sections of each consecutive row with rod-like sections of a second filter material to form assemblies wherein sections of first material alternate with sections of second material; and wrapping the assemblies into wrappers of adhesive-coated tape to form composite mouthpieces of multiple unit length.

17. A method of producing composite mouthpieces of multiple unit length, comprising the steps of advancing a series of parallel rods consisting of a first filter material sideways in an endless path; subdividing the rods in a cutting zone located in a first portion of said path to form pairs of coaxial rod-like members; removing the first rod-like member of each pair from a second portion of said path located past said first portion so that the second rod-like member of each pair remains in and advances toward the first portion of said path; shifting the second rod-like member of each pair axially and into the space previously occupied by the first rod-like member of the respective pair while the second rod-like members advance in a third portion of said path located ahead of said first portion so that the thus shifted second rod-like members bypass the cutting zone; removing the second rod-like members from the second portion of said path so that, upon removal from said path, the first and second rod-like members form a single file of transversely aligned members; subdividing each rod-like member at a cutting station into a row of coaxial sections of a length as required in a mouthpiece of multiple unit length; spreading the thus obtained sections by moving the sections of each consecutive row sideways in a series of arcuate paths of identical length but diverging in a direction away from said cutting station whereby the sections of each row are moved out of accurate axial alignment with each other; removing the sections of consecutive rows from said arcuate paths at a predetermined distance from said cutting station so that the sections are then located at a predetermined distance from each other; returning the thus removed sections in exact axial alignment with each other; shuffling the sections of each consecutive row with rod-like sections of a second filter material to form assemblies wherein sections of first material alternate with and are slightly spaced from sections of second filter material; shortening the assemblies to eliminate all clearances between the adjoining sections; and wrapping the thus shortened assemblies into wrappers of adhesive-coated tape to form composite mouthpieces of multiple unit length.

References Cited by the Examiner

UNITED STATES PATENTS

| | | | |
|---|---|---|---|
| 1,641,222 | 9/27 | Foisy | 83—411 |
| 2,123,580 | 7/38 | Gwinn et al. | 158—34 X |
| 2,801,727 | 8/57 | Macnati | 198—34 |
| 2,882,970 | 4/59 | Schur. | |
| 2,898,998 | 8/59 | Schur. | |

FRANK E. BAILEY, *Primary Examiner.*